(12) United States Patent
Hildebrand (10) Patent No.: US 8,639,956 B2
(45) Date of Patent: Jan. 28, 2014

(54) REDUCING ENERGY CONSUMPTION IN A COMPUTING CLUSTER

(75) Inventor: Dean Hildebrand, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 12/571,076

(22) Filed: Sep. 30, 2009

(65) Prior Publication Data
US 2011/0078467 A1 Mar. 31, 2011

(51) Int. Cl.
*G06F 1/32* (2006.01)
(52) U.S. Cl.
USPC .......................... 713/320; 713/300; 713/324
(58) Field of Classification Search
USPC ................................. 713/300, 320, 323, 324
See application file for complete search history.

(56) References Cited

U.S. PATENT DOCUMENTS

| | | | |
|---|---|---|---|
| 7,272,735 B2 | 9/2007 | Fung | |
| 2003/0079151 A1* | 4/2003 | Bohrer et al. | 713/320 |
| 2006/0212453 A1* | 9/2006 | Eshel et al. | 707/10 |
| 2007/0271475 A1* | 11/2007 | Hatasaki et al. | 713/324 |
| 2008/0141048 A1 | 6/2008 | Palmer et al. | |
| 2009/0083263 A1 | 3/2009 | Felch et al. | |
| 2009/0158074 A1 | 6/2009 | Oh et al. | |
| 2009/0240964 A1* | 9/2009 | Pfeiffer | 713/320 |

OTHER PUBLICATIONS

IBM Corporation, "IBM Storage Optimization and Integration Services—scale out file services", Data Sheet (GTD01407-USEN-01), Oct. 7, 2007.
Co-developed by Hewlett-Packard, Intel, Microsoft, Phoenix and Toshiba, ACPI Advanced Configuration & Power Interface, available on the web at www.acpi.info/.
E. Elnozahy et al., "Energy-Efficient Server Clusters*", proceedings of the 2nd Workshop on Power-Aware Computing Systems, 2002, available on the web at www.research.ibm.com/arl, 18 pages.
V. Sharma et al., "Power-aware QoS Management in Web Servers", Proceedings of the 24th IEEE International Real-Time Systems Symposium (RTSS'03), 2003, 10 pages.
IBM Corporation, "Enterprise File Management with GPFD 3.2", 2007. available on the web at www03.ibm.com/systems/clusters/software/.
L. Russell et al., "Clockwork: A new movement in autonomic systems", IBM Systems Journal, vol. 42, No. 1, 2003, pp. 77-84.
C. Weddle et al., "PARAID: A Gear-Shifting Power-Aware Raid", ACM Transactions on Storage, vol. 3, No. 2, Article 13, Oct. 2007, 33 pages.
IBM Corporation, "WebSphere Edge Server: Working with Web Traffic Express and Network Dispatcher", available on the web at www.redbooks.ibm.com/redbooks/SG246172/css/SG246172_1.html.
"Barracuda Load Balancer", available on the web at www.barracudanetworks.com/ns/products/balancer_overview.php, 1 page.

(Continued)

*Primary Examiner* — Paul Yanchus, III
(74) *Attorney, Agent, or Firm* — Mohammed Kashef (57) ABSTRACT

Embodiments of the invention relate to reducing energy consumption in a computing cluster. An aspect of the invention includes a method for reducing energy consumption in a computing cluster. The method includes monitoring requests to server. The method further includes activating a server, if at least one request is to be routed to the server in a reduced power consumption state. The method further includes routing the requests to at least one server. The method further includes reducing power consumption on the server, if the server does not have at least one active request.

16 Claims, 3 Drawing Sheets

(56) References Cited

OTHER PUBLICATIONS

Imada et al., "Power Management of Distributed Web Servers by Controlling Server Power State and Trafic Prediction for QoS", ENSPEC/IEEE, 2008, pp. 943-950.

Xu et al., "Energy-Efficient Policies for Embedded Clusters*", INSPEC/ACM; SIGPLAN Notices, vol. 40, No. 7, Jul. 2005, 10 pages.

IBM Corporation, "Optimizing the Energy Consumption of a Group of Servers"; ip.com, IBM Technical Bulletin, Apr. 8, 2009. 2 pages.

* cited by examiner

REDUCING ENERGY CONSUMPTION IN A COMPUTING CLUSTER

BACKGROUND

1. Field of the Invention

Embodiments of the disclosure relate to the field of cluster computing. In particular, embodiments of the disclosure further relate to reducing energy consumption in a computing cluster.

2. Background of the Invention

Energy consumption is increasing with the advent of computing technologies, even though, energy is an expensive commodity for computing technology operation. Moreover, energy costs continue to escalate while data centers and information technology (IT) infrastructures grow. As a result, managing power is an important consideration for enterprises when architecting an IT infrastructure. Energy consumption reduction results in lower operating expenses and extends IT equipment operating lifetime.

A computing cluster includes multiple systems that interact with each other to provide client systems with data, applications, and other system resources as a single entity. Computing clusters are loosely coupled and each server node uses the cluster file system to have concurrent shared access to applications or data. Computing cluster typically includes a file system to manage data storage within the computing cluster. Computing clusters increases scalability by allowing servers and shared storage devices to be incrementally added to the cluster. Computing clusters use redundancy to increase system availability and withstand hardware failures.

BRIEF SUMMARY

Embodiments of the invention relate to reducing energy consumption in a computing cluster. An aspect of the invention includes a method for reducing energy consumption in a computing cluster. The method includes monitoring requests to be routed to servers. The method further includes activating a server, if at least one request is to be routed to the server in a reduced power consumption state. The method further includes routing the requests to at least one server. The method further includes reducing power consumption on the server, if the server does not have at least one active request.

Another aspect of the invention includes a system for reducing energy consumption in a computing cluster. The system includes a monitoring module configured to monitor requests to be routed to servers. The system further includes a power management module coupled to the monitoring module. The power management module is configured to activate a server in a reduced power consumption state, if at least one request is to be routed to the server. The power management module is further configured to reduce power consumption on a server node, if the server node does not have at least one active request. The system further includes a routing module coupled to the power management module. The routing module is configured to route the requests to at least one server.

Another aspect of the invention includes a computer program product for reducing energy consumption in a computing cluster. The computer program product includes a computer readable storage medium having computer readable program code embodied therewith. The computer readable storage medium includes computer readable program code configured to monitor requests to be routed to server nodes. The computer readable storage medium further includes computer readable program code configured to activate a server, if at least one request is to be routed to the server in a reduced power consumption state. The computer readable storage medium further includes computer readable program code configured to reduce power consumption on a server node, if the server node does not have at least one active request. The computer readable storage medium further includes computer readable program code configured to route the requests to at least one server.

These illustrative embodiments are mentioned not to limit or define the invention, but to provide examples to aid understanding thereof. Illustrative embodiments are discussed in the Detailed Description, and further description of the disclosure is provided there. Advantages offered by various embodiments of this disclosure may be further understood by examining this specification.

BRIEF DESCRIPTION OF THE SEVERAL VIEWS OF THE DRAWINGS

These and other features, aspects, and advantages of the present invention are better understood when the following Detailed Description is read with reference to the accompanying drawings, wherein.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc. The description may disclose several preferred embodiments for file management in a shared file system. While the following description will be described in terms of such languages for clarity and placing the invention in context, it should be kept in mind that the teachings herein may have broad application to all types of systems, devices and applications.

Figure 1:
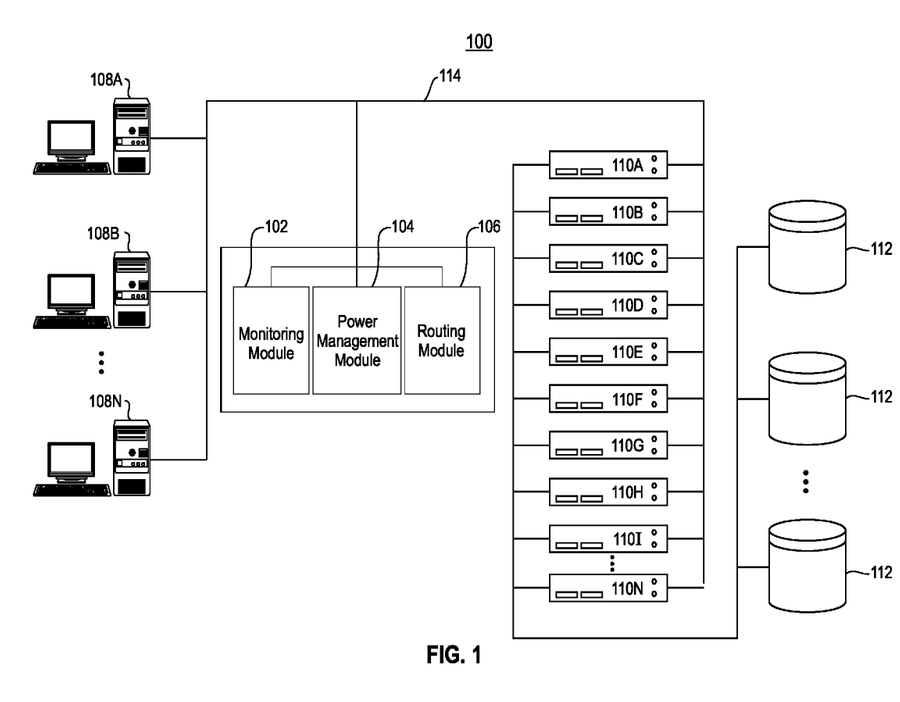
FIG. 1 illustrates a system for reducing energy consumption in a computing cluster, according to one embodiment.

FIG. 1 illustrates a system 100 for reducing energy consumption in a computing cluster by load balancing requests, according to one embodiment. The system 100 includes a monitoring module 102. The monitoring module 102 is configured to monitor requests to servers. The system 100 further includes a power management module 104 coupled to the monitoring module 102. The power management module 104 is configured to activate a server node in a reduced power consumption state, if at least one request is to be routed to the server node. A server is activated from the reduced power consumption state. The power management module 104 is further configured to reduce power consumption on a server node, if the server node does not have at least one active request.

The system further includes a routing module 106 coupled to the power management module 104. The routing module 106 is configured to route the plurality of requests to at least one server node. The routing module 106 takes a series of actions that ensures requests are routed correctly, which includes the creation of a layout structure that must be returned to the requesting node to ensure requests are being routed correctly.

The system 100 further includes a plurality of server nodes 110a, 110b, 110c, 110d, 110e, 110f, 110g, 110h, and 110i . . . 110n. While ten server nodes 110 are illustrated, it is to be understood there may be 2 to "n" number of server nodes, where "n" equals any desired number of client computing nodes in a computing cluster. The server nodes are coupled to the monitoring module 102, the power management module 104, and the routing module 106 over a local area network 114. The server nodes are configured to receive client data access requests.

The monitoring module 102, power management module 104, and routing module 106 may reside in any node within system 100. The monitoring module 102, power management module 104, and routing module 106 may reside in a server node 110a . . . 110n in the computing cluster 100 or may reside on an independent computing node connected to the computing cluster system 100 over the local area network 114.

The system 100 may include various server nodes in a computing cluster. The server nodes 110a, 110b . . . 110n may include various application servers to host software applications in a computing cluster. The server nodes 110a, 110b . . . 110n may further include file servers to host the processing of shared files in a computing cluster. The server nodes 110a, 110b . . . 110n may further include database servers to host the processing of databases in a computing cluster. The server nodes 110a, 110b . . . 110n may further include mail servers to host the processing of email services in a computing cluster.

The system 100 further includes storage repositories 112a, 112b . . . 112n. While three storage repositories 112a, 112b . . . 112n are illustrated, it is to be understood there may be 1 to "n" number of storage repositories, where "n" equals any desired number of storage repositories. The storage repositories 112a, 112b . . . 112n are coupled to the server nodes 110a, 110b . . . 110n over the local area network 114. The storage repositories 112a, 112b . . . 112n are configured to retain or store data used for computing the data access requests for server nodes 110a, 110b . . . 110n.

The storage repositories 112a, 112b . . . 112n can include various storage architectures. The storage repositories 112a, 112b . . . 112n can be a Storage Area Network (SAN), a locally attached computer storage device such as disk arrays, tape libraries, and optical jukeboxes, according to one embodiment. In a preferred embodiment, the storage repositories 112a, 112b . . . 112n include a Network Attached Storage (NAS), a hard disk drive storage device connected to other devices over local area network 114.

The system 100 further includes client computing nodes 108a, 108b . . . 108n. While three client computing nodes 110 are illustrated, it is to be understood there may be 1 to "n" number of client computing nodes, where "n" equals any desired number of client computing nodes. The client computing nodes 108a, 108b . . . 108n may be coupled to the system 100 via a network over a wide area network connected to the local area network 114 or local to the system 100 and connected directly over the local area network 114.

The client computing nodes are configured to send and receive various data access requests to the server nodes 110a, 100b . . . 110n and receive data from the server nodes 110a, 100b . . . 110n. The client nodes 108a, 108b . . . 108n run applications that generate data access requests to the server nodes 110a, 110b . . . 110n. The client nodes 108a, 108b . . . 108n satisfy the data requests by sending requests to the server nodes 110a, 110b . . . 110n.

The client computing nodes 108a, 108b, and 108n may perform data access requests using any custom, proprietary, or standard file system protocol to access a disk file system, distributed file system, or a special purpose file system. For example, a special purpose file system can be remotely accessed via the Common Internet File System (CIFS). In a preferred embodiment, the Network File System (NFS) protocol is used to facilitate the transmission of application data requests from the client computing nodes 108a, 108b, and 108n to the server nodes 110a, 110b . . . 110n in the system 100 computing cluster.

The server nodes 110a, 110b . . . 110n form a cluster file system. The cluster file system provides scalable, high-performance, and failure resilient client access with multiple server nodes to serve the client requests. In a preferred embodiment, any server among server nodes 110a, 110b . . . 110n in the cluster file system 100 can serve data access requests from client nodes 108a, 108b . . . 108n. In another embodiment, only a subset of server nodes 110a, 110b . . . 110n in the cluster file system 100 has the ability to serve specific data access request from client nodes 108a, 108b . . . 108n. In a preferred embodiment, all server nodes 110a, 110b . . . 110n in the computing cluster of system 100 are initially active.

In a preferred embodiment the cluster file system is a shared-disk cluster file system. In the preferred embodiment the storage repositories 112a, 112b . . . 112n provide a shared storage subsystem to server nodes 110a, 110b . . . 110n. For example, scalable NAS storage systems use clustered client-server architecture in a single unified system. In another embodiment, the cluster file system is a non-shared disk cluster file system which is composed of the server nodes 110a, 110b . . . 110n. In a preferred embodiment, the cluster file system is configured to handle peak or maximum load of client requests.

Client nodes 108a, 108b . . . 108n establish connections to the server nodes 110a, 110b . . . 110n over the local area network 114. In a preferred embodiment, the client nodes 108a, 108b . . . 108n are connected to the server nodes 110a, 110b . . . 110n in the cluster file system 100 using a round-robin algorithm. In another embodiment, the client nodes 108a, 108b . . . 108n are connected to the server nodes 110a, 110b . . . 110n randomly over local area network 114.

Requests originating from client computing nodes 108a, 108b . . . 108n are distributed among server nodes 110a, 110b . . . 110n. In one embodiment, requests are distributed among server nodes 110a, 110b . . . 110n using a Domain Name System (DNS). In a preferred embodiment, the distribution of requests among the server nodes 110a, 110b . . . 110n may be provided by having all client nodes 108a, 108b . . . 108n mounted to a single server 110a, with server 110a redirecting clients to the other servers 110b . . . 110n in a round-robin fashion. The network connection can use any layer-4 network protocol. In a preferred embodiment, a Remote Direct Memory Access (RDMA) protocol is used for the client-server distribution connection. In another embodiment, User Datagram Protocol (UDP) and/or Transmission Control Protocol (TCP) is used for the client-server distribution connection.

The client node requests are distributed among the server nodes 110a, 110b . . . 110n. In a preferred embodiment, the client node requests are distributed among the server nodes 110a, 110b . . . 110n using an application level process. Each client node maintains the mapping at the application level. In a preferred embodiment, the client-server binding is managed via an application level process such as 'mount' or the file system client. Each server node 110a, 110b ... 110n also maintains the mapping at the application level. In the preferred embodiment, this binding of client-server is managed via a Mapping Service process with the cluster file system 100. One client may also send data access requests to multiple server nodes 110a, 110b ... 110n in parallel, whereas the initial mapping/connection is to a single server.

Figure 2:
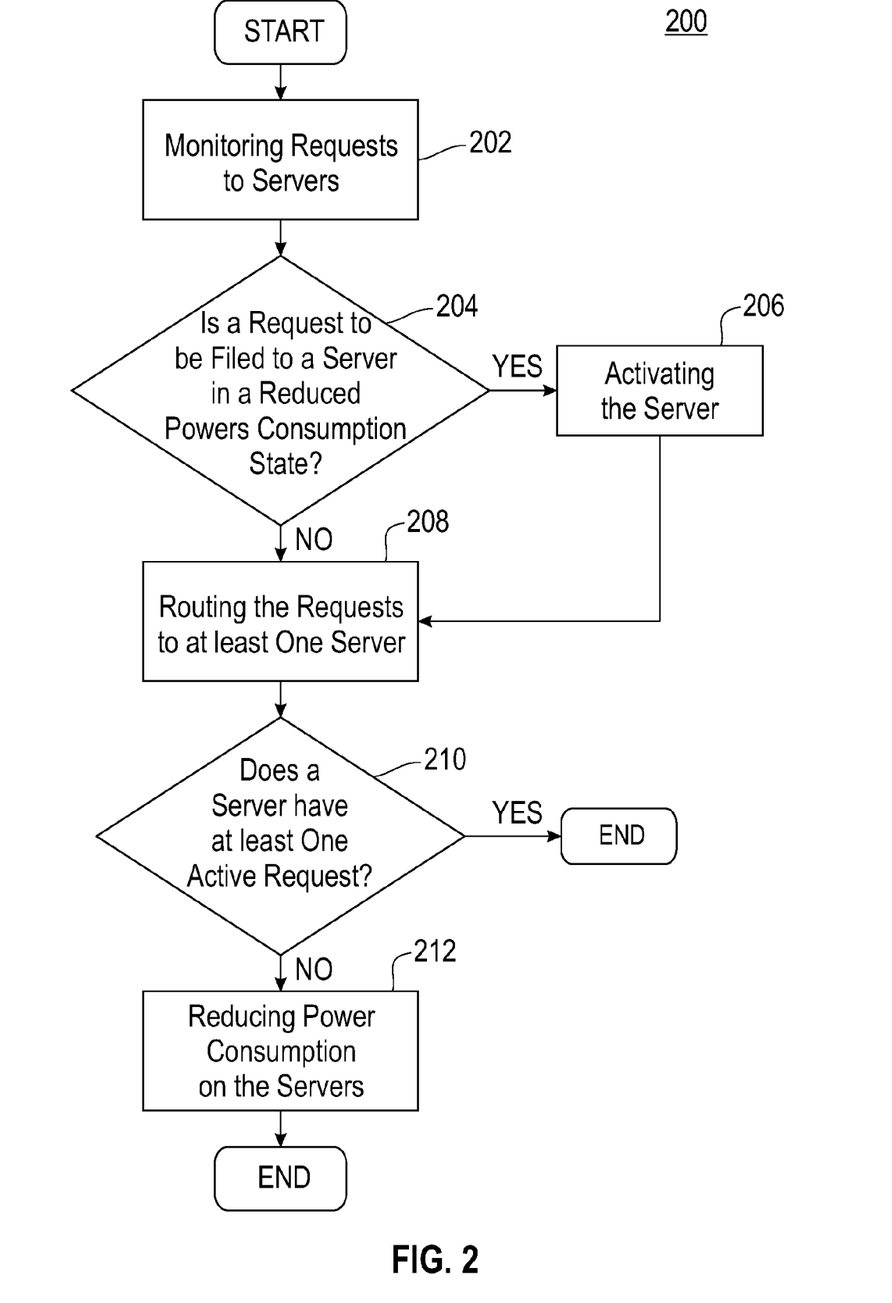
FIG. 2 illustrates a flow chart of a method for reducing energy consumption in a computing cluster, according to one embodiment.

FIG. 2 illustrates a method 200 for reducing energy consumption in cluster computing system 100 by load balancing requests, according to one embodiment. The monitoring module 102 monitors data access requests (step 202) from client computing nodes 108a, 108b ... 108n to the server nodes 110a, 110b ... 110n. The power management module 104 determines whether a data access request is to be routed to a server of server nodes 110a, 110b ... 110n is in a reduced power state (step 204). The power management module 104 activates a server among server nodes 110a, 110b ... 110n, if at least one request is to be routed to the server in a reduced power consumption state (step 206).

The method 200 then proceeds to step 208. The method 200 also proceeds to step 208 if a request is not routed to a server in a reduced power state. The routing module 106 sets the client-server mapping such that data access requests are routed to at least one server (step 208) of server nodes 110a, 110b ... 110n.

The power management module 104 further determines whether a server among server nodes 110a, 110b ... 110n has at least one active request (step 210). The method 200 ends if the server in the cluster file system 100 does not have at least one active request. The method 200 proceeds to step 212 if the server does not have at least one active request. The power management module 104 reduces power consumption on the server that does not have at least one active request (step 212).

In a preferred embodiment, the monitoring module 102 is further configured to monitor a resource utilization of the plurality of server nodes 110a, 110b ... 110n. The monitoring module 102 uses a performance monitor to monitor the resource utilization of the plurality of server nodes 110a, 110b ... 110n. In the preferred embodiment, monitoring resource utilization can be done passively, with server nodes 110a, 110b ... 110n updating the service with resource utilization information. In another embodiment, monitoring server resource utilization can be done actively via polling of the server nodes 110a, 110b ... 110n and the storage repositories 112a, 112b ... 112n. The performance monitor service may be distributed or management centrally by the monitoring module 102.

The monitoring module 102 monitors server resource utilization of the plurality of server nodes 110a, 110b ... 110n. The routing module 106 re-routes requests to have a minimum aggregate number of server nodes needed in an active state. The routing module 106 re-routes requests in response to the monitoring module 102 monitoring server resource utilization. The minimum aggregate number of server nodes needed is the least aggregate number of server nodes 110a, 110b ... 110n needed to execute requests from the client computing node 108a, 108b ... 108n. The routing module 106 re-routes request(s) from a first server node to a second server to maintain a minimum aggregate number server nodes in an active state. The routing module 106 saturates the client computing node 108a, 108b ... 108n request to optimize utilization of server nodes 110a, 110b ... 110n.

In a preferred embodiment, the performance monitor service predicts resource utilization of server nodes 110a, 110b ... 110n. The routing module 106 routes requests from client computing nodes 108a, 108b ... 108n based, in-part, on the prediction of the resource utilization of server nodes 110a, 110b ... 110n.

The monitoring module 102 runs the performance monitor resource utilization of server nodes 110a, 110b ... 110n. The performance monitor monitors storage controller utilization of server nodes 110a, 110b ... 110n. The performance monitor further monitors network utilization. The performance monitor further monitors file sizes being accessed by a client computing node 108a, 108b ... 108n by monitoring the number of bytes requested or written in data access requests. The performance monitor further monitors data request size. The performance monitor further monitors central processing unit utilization of server nodes 110a, 110b ... 110n. The performance monitor further monitors random access memory utilization of server nodes 110a, 110b ... 110n. The performance monitor further monitors an aggregate number of metadata requests. The performance monitor further monitors data access patterns which includes the ratio of reads to writes. The performance monitor further monitors a aggregate number of requests from client computing node 108a, 108b ... 108n to server nodes 110a, 110b ... 110n.

The power management module 104 activates a server among server nodes 110a, 110b ... 110n if at least one request is to be routed to the server in a reduced power consumption state. The power management module 104 activates the server prior to the request being routed to the server. The power management module 104 activates servers with an optimization goal and increases an aggregate number of servers in such a way that client requests saturate, but not over saturate, the available resources. Saturation threshold is based on the pre-determined preferred performance tradeoffs. The power management module 104 increases the aggregate number of active server nodes 110a, 110b ... 110n as the client data access requests increase, while meeting a pre-determined service level agreement of client computing nodes 108a, 108b ... 108n.

In a preferred embodiment, the power management module 104 activates server nodes 110a, 110b ... 110n from sleep mode using Wake-on-LAN (WOL) technology, a networking standard. The WOL technology allows a server to be turned on or woken up remotely by a network message sent usually by a simple program executed on another computer on the network. WOL technology is implemented on each the server nodes' 110a, 110b ... 110n motherboard and network interface. WOL technology is, as a result, not dependent on the server nodes 110a, 110b ... 110n operating system running on the hardware.

The power management module 104 reduces power consumption on a server if the server does not have at least one active request. The power management module 104 directs each of the client computing nodes' 108a, 108b ... 108n data access requests to a minimum aggregate number of servers that can satisfy current client data access requests. The aggregate number of active server nodes 110a, 110b ... 110n is reduced as the client data access requests decrease, while meeting a pre-determined server level agreement. The goal is to increase the number of servers in such a way that the client computing nodes' 108a, 108b ... 108n requests saturate, but not over saturate the server nodes 110a, 110b ... 110n available resources.

The power management module 104 reduces power consumption in server nodes 110a, 110b ... 110n by sending a migration request to the active server to which a client computing node 108a, 108b ... 108n is currently connected but is no longer needed to facilitate a client data access request. The routing module 106 client-server mapping service ensures that all future data access requests for the client computing nodes 108a, 108b . . . 108n are sent to another server in the cluster file system 100.

The power management module 104 places those server nodes 110a, 110b . . . 110n no longer handling client computing nodes' 108a, 108b . . . 108n data access requests in a reduced power consumption state. The power management module 104 uses any known power reducing method to reduce power consumption or activate server nodes 110a, 110b . . . 110n. In a preferred embodiment, the power management module 104 has a reducing service that uses the Advanced Configuration and Power Interface (ACPI) standard to reduce power consumption or active a server. The ACPI standard is used to change a server's system states, device states, and processor states.

The server nodes 110a, 110b . . . 110n system states include working, sleeping, soft off, and mechanical off. Working is a system state wherein the server is active with all components receiving power. Sleeping includes four sub-system states, including: (i) a CPU stopped from executing instructions, (ii) the CPU being is powered off, (iii) RAM being suspended, and (iv) hibernation (all content in RAM is saved to non-volatile memory and the RAM is powered down). Mechanical-off includes the server's power consumption being reduced to zero. Soft-off includes some components remaining powered so the computer can wake from input from a keyboard, clock, modem, LAN, or USB device. The ACPI standard system states may include additional system states and variations of the system states above.

The server nodes 110a, 110b . . . 110n device states include device-dependent states of fully-on, intermediate power states, and off. The device state fully-on is where a device is in a fully functional operating state. The intermediate power device state varies by device and has the similarity of devices not receiving full power to be a full operating state. The device states apply to individual components of the server nodes 110a, 110b . . . 110n and servers may vary with which components the servers comprise.

The server nodes 110a, 110b . . . 110n processor states include an operating state, a halt state, a stop-clock state, and a sleep state. The processor operating state provides full power to the server's processor(s). The processor halt state is state wherein the processor is not executing instructions, but can return to an executing state instantaneously. The processor stop-clock state is a state wherein the processor maintains only the software-visible states. The processor sleep state is a state wherein the processor does not maintain the cache active. The ACPI standard processor states may include additional system states and variations of the system states above.

The routing module 106 runs a client-server mapping service to route client computing nodes' 108a, 108b . . . 108n data access requests. The routing module 106 runs a client-server mapping service to determine a minimum aggregate number of server nodes 110a, 110b . . . 110n needed to execute the data access requests in cluster file system 100. The client-server mapping service runs an optimization algorithm on each client computing node 108a, 108b . . . 108n request based on the information gathered by a performance monitor service to determine the minimum number of active server nodes 110a, 110b . . . 110n required to execute client data access requests. The client-server mapping service uses information from the performance monitor service to decide, at any point in time, the number of 'active' server nodes 110a, 110b . . . 110n and the mapping of client computing nodes 108a, 108b . . . 108n. The client-server mapping service tracks the client-server mapping by having the server nodes 110a, 110b . . . 110n update this service with the network names or network addresses of the client computing nodes 108a, 108b . . . 108n connected to it.

Any optimization algorithm known to one skilled in the art may be employed by the routing module 106 to determine how many server nodes 110a, 110b . . . 110n in the cluster file system 100 should be utilized. The optimization algorithm run by the routing module 106 has the goal of always having the minimum required aggregate number of server nodes 110a, 110b . . . 110n active in the cluster file system 100 to provide the pre-determined preferred performance to client computing nodes 108a, 108b . . . 108n.

The routing module 106 uses a file access protocol redirection technique to route the client computing nodes 108a, 108b . . . 108n data access requests to the server nodes 110a, 110b . . . 110n. In a preferred embodiment, the file access protocol redirection technique includes Parallel Network File System (pNFS) NFSv4.1, NFSv4, NFSv3, NFS2, CIFS, and iSCSI. In other embodiments, any other distributed file access protocols known in the art may be used for specific file system clusters. For example, AFS, DFS, Apple Filing Protocol (AFP).

pNFS (part of NFSv4.1) is performed by all server nodes 110a, 110b . . . 110n, wherein a server issues a CB_DEVICE_NOTIFY command to all connected client computing nodes 108a, 108b . . . 108n to updates their list of "active" server nodes 110a, 110b . . . 110n. The CB_DEVICE_NOTIFY command is issued once a server is notified by the client-server mapping service running on the routing module 106 of an update to the number of servers. A LAYOUTGET operation is also used by the client-server mapping service running on the routing module 106 to obtain device ids of server nodes 110a, 110b . . . 110n are in an active state. A pNFS client mounts a pNFS server exporting cluster file system 100 using the standard operating system specific mount command.

For example, Client computing node 108a, 108b . . . 108n first issues a LAYOUT_GET operation upon requesting data access to the servers. A layout is returned by the routing module 106 which contains one or more server nodes 110a, 110b . . . 110n ids. For each server nodes 110a, 110b . . . 110n id, the client computing nodes 108a, 108b . . . 108n issues a GETDEVICEINFO request to retrieve complete information regarding each server node 110a, 110b . . . 110n id. The IDs comprise the list of active servers. The routing module 106 clients then combine the information in the layout and the list of server nodes 110a, 110b . . . 110n (obtained from the GETDEVICEINFO operation) to perform I/O.

The power management module 104 increases the number of active server nodes 110a, 110b . . . 110n and ensures they are fully operational when the client-server mapping service running on the routing module 106 predicts increasing client load on servers. All server nodes 110a, 110b . . . 110n are notified by the routing module 106 client-server mapping service that the number of active servers has been increased. Each cluster file system 100 server then instructs the pNFS server to initiate a CB_DEVICE_NOTIFY command to the client computing nodes 108a, 108b . . . 108n to update their list of "active" servers. For all subsequent LAYOUTGET operations from client computing nodes 108a, 108b . . . 108n, each server will use a device id that contains the new list of "active" servers.

The power management module 104 decreases the number of active server nodes 110a, 110b . . . 110n when the client-server mapping service predicts decreasing client load on servers. All server nodes 110a, 110b . . . 110n in the cluster file system 100 are notified by the routing module 106 client-server mapping service that the number of active servers has been decreased. Each server then instructs the pNFS server to initiate a CB_DEVICE_NOTIFY to all connected client computing nodes 108a, 108b . . . 108n to update their list of "active" servers. The server nodes 110a, 110b . . . 110n use a device id that contains the new list of "active" servers for all subsequent LAYOUTGET operations from client computing nodes 108a, 108b . . . 108n. The power management module 104 reduces power consumption on the new inactive servers once all client computing nodes 108a, 108b . . . 108n have been informed of the new smaller list of active servers.

NFSv4 uses the standard mechanism of referrals to redirect clients from one server to another. NFSv4 referrals can include the use of the FS_LOCATIONS attribute and the return code NFS4ERR_MOVED.

With NFSv3 and NFSv2, the standard mechanism of IP takeover can be used to migrate client computing nodes 108a, 108b . . . 108n from an inactive server to an active server (and vice-versa). NFSv3/2 can accomplish IP takeover in several ways known in the art.

Common Internet File System (CIFS) can use the standard mechanism of CIFS referrals to redirect client requests from one server to another.

With the Internet Small Computer System Interface (iSCSI), one way to redirect client requests within a virtual machine (VM) is to run an iSCSI target. The VM can be migrated live from an inactive server to an active server (and vice-versa).

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 3:
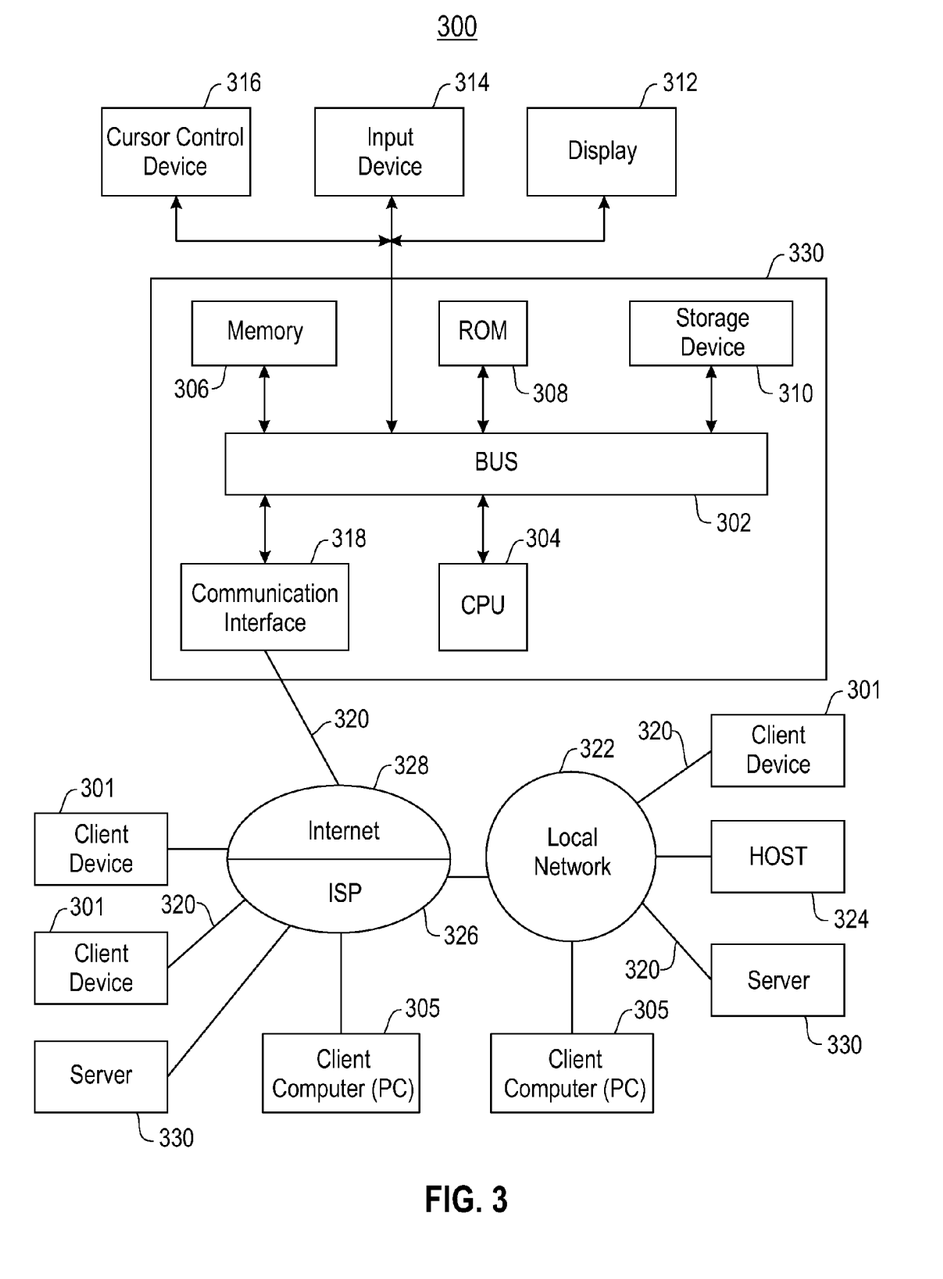
FIG. 3 illustrates a block diagram of a system in which a process for reducing energy consumption in a computing cluster may be implemented, according to one embodiment.

FIG. 3 illustrates a block diagram of a system in which a process for reducing energy consumption in a computing cluster may be implemented, according to one embodiment. The system 300 includes one or more client devices 301 connected to one or more server computing systems 330. A server 330 includes a bus 302 or other communication mechanisms for communicating information, and a processor (CPU) 304 coupled with the bus 302 for processing information. The server 330 also includes a main memory 306, such as a random access memory (RAM) or other dynamic storage device, coupled to the bus 302 for storing information and instructions to be executed by the processor 304. The main memory 306 also may be used for storing temporary variables or other intermediate information during execution or instructions to be executed by the processor 304.

The server computer system 330 further includes a read only memory (ROM) 308 or other static storage device coupled to the bus 302 for storing static information and instructions for the processor 304. A storage device 310, such as a magnetic disk or optical disk, is provided and coupled to the bus 302 for storing information and instructions. The bus 302 may contain, for example, thirty-two address lines for addressing video memory or main memory 306. The bus 302 can also include, for example, a 32-bit data bus for transferring data between and among the components, such as the CPU 304, the main memory 306, video memory and the storage 310. Alternatively, multiplex data/address lines may be used instead of separate data and address lines.

The server 330 may be coupled via the bus 302 to a display 312 for displaying information to a computer user. An input device 314, including alphanumeric and other keys, is coupled to the bus 302 for communicating information and command selections to the processor 304. Another type of user input device comprises cursor control 316, such as a mouse, a trackball, or cursor direction keys for communicating direction information and command selections to the processor 104 and for controlling cursor movement on the display 312.

The functions of the invention are performed by the server 330 in response to the processor 304 executing one or more sequences of one or more instructions contained in the main memory 306. Such instructions may be read into the main memory 306 from another computer-readable medium, such as the storage device 310. Execution of the sequences of instructions contained in the main memory 306 causes the processor 304 to perform the process steps described herein. One or more processors in a multi-processing arrangement may also be employed to execute the sequences of instructions contained in the main memory 306. In alternative embodiments, hard-wired circuitry may be used in place of or in combination with software instructions to implement the invention. Thus, embodiments of the invention are not limited to any specific combination of hardware circuitry and software.

Various forms of computer readable media may be involved in carrying one or more sequences of one or more instructions to the processor 304 for execution. For example, the instructions may initially be carried on a magnetic disk of a remote computer. The remote computer can load the instructions into its dynamic memory and send the instructions over a telephone line using a modem. A modem local to the server 330 can receive the data on the telephone line and use an infrared transmitter to convert the data to an infrared signal. An infrared detector coupled to the bus 302 can receive the data carried in the infrared signal and place the data on the bus 302. The bus 302 carries the data to the main memory 306, from which the processor 304 retrieves and executes the instructions. The instructions received from the main memory 306 may optionally be stored on the storage device 310 either before or after execution by the processor 304.

The server 330 also includes a communication interface 318 coupled to the bus 302. The communication interface 318 provides a two-way data communication coupling to a network link 320 that is connected to the world wide packet data communication network now commonly referred to as the Internet 328. The Internet 328 uses electrical, electromagnetic or optical signals that carry digital data streams. The signals through the various networks and the signals on the network link 320 and through the communication interface 318, which carry the digital data to and from the server 330, are exemplary forms or carrier waves transporting the information.

In another embodiment of the server 330, interface 318 is connected to a network 322 via a communication link 320. For example, the communication interface 318 may be an integrated services digital network (ISDN) card or a modem to provide a data communication connection to a corresponding type of telephone line, which can comprise part of the network link 320. As another example, the communication interface 318 may be a local area network (LAN) card to provide a data communication connection to a compatible LAN. Wireless links may also be implemented. In any such implementation, the communication interface 318 sends and receives electrical electromagnetic or optical signals that carry digital data streams representing various types of information.

The network link 320 typically provides data communication through one or more networks to other data devices. For example, the network link 320 may provide a connection through the local network 322 to a host computer 324 or to data equipment operated by an Internet Service Provider (ISP) 326. The ISP 326 in turn provides data communication services through the Internet 328. The local network 322 and the Internet 328 both use electrical, electromagnetic or optical signals that carry digital data streams. The signals through the various networks and the signals on the network link 120 and through the communication interface 318, which carry the digital data to and from the server 330, are exemplary forms or carrier waves transporting the information.

The server 330 can send/receive messages and data, including e-mail, program code, through the network, the network link 320 and the communication interface 318. Further, the communication interface 318 can comprise of a USB/Tuner and the network link 320 may be an antenna or cable for connecting the server 330 to a cable provider, satellite provider or other terrestrial transmission system for receiving messages, data and program code from another source.

The example versions of the invention described herein may be implemented as logical operations in a distributed processing system such as the system 300 including the servers 330. The logical operations of the present invention can be implemented as a sequence of steps executing in the server 330, and, as interconnected machine modules, within the system 300. The implementation is a matter of choice and can depend on performance of the system 300 implementing the invention. As such, the logical operations constituting said example versions of the invention are referred to for e.g. as operations, steps or modules.

Similar to a server 330 described above, a client device 301 can include a processor, memory, storage device, display, input device and communication interface (e.g., e-mail interface) for connecting the client device to the Internet 328, the ISP 326, or LAN 322, for communication with the servers 330.

The system 300 can further include computers (e.g., personal computers, computing nodes) 305 operating the same manner as client devices 301, wherein a user can utilize one or more computers 305 to manage data in the server 330.

Generally, the term "computer-readable medium", as used herein, refers to any medium that participated in providing instructions to the processor 304 for execution. Such a medium may take many forms, including but not limited to, non-volatile media, volatile media and transmission media. Non-volatile media includes, for example, optical or magnetic disks, such as the storage device 310. Volatile media includes dynamic memory, such as the main memory 306. Transmission media includes coaxial cables, copper wire and fiber optics, including the wires that comprise the bus 302.

Transmission media can also take the form of acoustic or light waves, such as those generated during radio wave and infrared data communications.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for reducing energy consumption of file servers in a cluster by coordinating live migration of client data access requests between file servers in the cluster, the cluster including file servers and a shared storage subsystem with a clustered file system, the method comprising:
    monitoring data access requests to said file system and resource utilization of said cluster, said requests coming from clients of said file system and are routed to active file servers in said cluster that a particular file system client is mapped to for mounting said file system;
    determining, based on said monitoring, a minimum aggregate number of active file servers in the cluster for serving the data access requests;
    mapping, based on said determining, said file system's clients to file servers in the cluster such that data access requests from a particular client are routed to a particular file server said particular client is mapped to;
    if a client of said file system is mapped to an inactive file server, activating said server, wherein a server is inactive if the server is in a reduced power consumption state;
    if an active file server does have at least one client of said file system mapped to said active file server, deactivating said server such that said server is inactive;
    redirecting existing data access requests based on said mapping by live migration such that the existing data access requests are uninterrupted;
    deactivating a file server after data access requests the file server was serving have been redirected such that said deactivated server is inactive; and
    sending a file system client, that is associated with a data access request, a file system layout based on said mapping, said layout being used by said client to identify which file server in the cluster to send a new data access request to, and said layout includes device IDs of file servers in the cluster and information indicating whether a server corresponding to a device ID is active or inactive.

2. The method of claim 1, wherein said redirecting includes sending a migration request, prior to said migration, to a file server that a file system client was mapped to, if the file system client becomes mapped to a different file server based on said mapping, and sending a client's current working state to a new file server (the client's data access request is being redirected to) such that said new server has access to the client's current working state.

3. The method of claim 2, wherein said redirection is done using a file access redirection protocol of said file system.

4. The method of claim 2, wherein said redirection is requested using a client-server mapping service.

5. The method of claim 1, wherein said reduced power consumption state is achieved by changing a server's state selected from the group consisting of: a system state, a device state, and a processor state.

6. The method of claim 5, wherein said states include working, sleeping, soft off, and mechanical off.

7. The method of claim 1, wherein said file servers include virtual machines and/or stand-alone servers.

8. The method of claim 1, wherein said activating done using an activation service.

9. The method of claim 1, wherein said monitoring is done using a performance monitor service.

10. The method of claim 1, wherein said deactivating is done using a reducing service.

11. The method of claim 7, wherein said reducing service uses an Advanced Configuration and Power Interface (ACPI) specification.

12. The method of claim 1, wherein said mapping includes assigning file system clients to servers in a round-robin order.

13. The method of claim 1, wherein said resource utilization includes load information selected from the group consisting of: a number of file system data access requests, size of file system data access requests, number of file system metadata requests, shared storage utilization, file system network utilization, server CPU utilization, available server memory, and a number of active and inactive servers.

14. A computer program product for reducing energy consumption of file servers in a cluster by coordinating live migration of client data access requests between file servers in the cluster, the cluster including file servers and a shared storage subsystem with a clustered file system, the computer program product comprising a computer-useable non-transitory storage medium having a computer-readable program embodied therewith, said program code being executable by a computer to:
monitor data access requests to said file system and resource utilization of said cluster, said requests coming from clients of said file system and are routed to active file servers in said cluster that a particular file system client is mapped to for mounting said file system;
determine, based on said monitoring, a minimum aggregate number of active file servers in the cluster for serving the data access requests;
map, based on said determining, said file system's clients to file servers in the cluster such that data access requests from a particular client are routed to a particular file server said particular client is mapped to;
if a client of said file system is mapped to an inactive file server, activate said server, wherein a server is inactive if the server is in a reduced power consumption state;
if an active file server does have at least one client of said file system mapped to said active file server, said server such that said server is inactive;
redirect existing data access requests based on said mapping by live migration such that the existing data access requests are uninterrupted wherein, said redirect includes sending a migration request, prior to said migration, to a file server that a file system client was mapped to, if the file system client becomes mapped to a different file server based on said mapping, and sending a client's current working state to a new file server (the client's data access request is being redirected to) such that said new server has access to the client's current working state; and
deactivate a file server after data access requests the file server was serving have been redirected such that said deactivated server is inactive.

15. The computer program product of claim 14, wherein the program code is further executable by a computer to:
send a file system client, that is associated with a data access request, a file system layout based on said mapping, said layout being used by said client to identify which file server in the cluster to send a new data access request to, and said layout includes, and said layout includes device IDs of file servers in the cluster and information indicating whether a server corresponding to a device ID is active or inactive.

16. A system for reducing energy consumption of file servers in a cluster by coordinating file server migration while serving file access protocol requests, comprising:
a computing cluster in communication with file system clients that includes:
a plurality of file servers,
a shared storage subsystem having a clustered file system, and
a computer-useable storage medium having a computer-readable program, wherein the program upon being executable by a computer to:
monitor data access requests to said file system and resource utilization of said cluster, said requests coming from clients of said file system and are routed to active file servers in said cluster that a particular file system client is mapped to for mounting said file system;
determine, based on said monitoring, a minimum aggregate number of active file servers in the cluster for serving the data access requests;
map, based on said determining, said file system's clients to file servers in the cluster such that data access requests from a particular client are routed to a particular file server said particular client is mapped to;
if a client of said file system is mapped to an inactive file server, activate said server, wherein a server is inactive if the server is in a reduced power consumption state;
if an active file server does have at least one client of said file system mapped to said active file server, deactivate said server such that said server is inactive;
redirect existing data access requests based on said mapping by live migration such that the existing data access requests are uninterrupted; and
deactivate a file server after data access requests the file server was serving have been redirected such that said deactivated server is inactive; and
sending a file system client, that is associated with a data access request, a file system layout based on said mapping, said layout being used by said client to identify which file server in the cluster to send a new data access request to, and said layout includes device IDs of file servers in the cluster and information indicating whether a server corresponding to a device ID is active or inactive.

* * * * *